UNITED STATES PATENT OFFICE.

BERTHOLD SINGER, OF CHICAGO, ILLINOIS.

DUST COLLECTING OR ABSORBING SUBSTANCE.

No. 833,423.  Specification of Letters Patent.  Patented Oct. 16, 1906.

Application filed September 21, 1905. Serial No. 279,503.

*To all whom it may concern:*

Be it known that I, BERTHOLD SINGER, a citizen of the United States, and a resident of Chicago, in the county of Cook and State of Illinois, have invented certain new and useful Improvements in Dust Collecting or Absorbing Substances, of which the following is a full, clear, and exact description.

My invention relates to improvements in dust collecting or absorbing substances adapted to be spread upon floors, carpets, or other dust-laden surfaces and serving to absorb or collect the dust particles thereon, rendering the surface clean upon removal of the substance by sweeping or other means.

The present invention consists in the process and product and is an improvement upon the process disclosed in my copending application for a composition of matter for laying and absorbing dust, filed December 22, 1904, Serial No. 238,028. The improved product and process of the present invention is designed to perform like functions and possesses similar advantages to the invention disclosed by the above-identified application, the present invention having for its object an improved process wherein the steps in making such a composition of matter are reduced in number and wherein the number of ingredients is also reduced and the product made to more effectively perform its function.

The present improved process consists, broadly, in the addition to a main stock or base of macerated and highly absorbent material (such as sawdust in a dry state) of a suitable oil or oily substance, in next effecting a thorough physical mixture of the oil and the stock or base, and in subsequently and further treating the mixture until the oil has been thoroughly absorbed by the sawdust and in some cases adding and mixing a quantity of a silicious or like material. One of the chief difficulties encountered in the production of a composition of matter of this nature is in so effectively combining the oil with its absorbent that the former will retain an affinity for the dust particles and will not adhere and stain the surface or material to be cleaned. This union of the two ingredients is more perfectly effected when the absorbent is thoroughly impregnated with the oil in a manner to render the latter's presence obvious only by a glassy or glazy appearance on the surfaces of the absorbent, it having been found that where the oil is present in globules or minute particles the substance does not perform its function without to a more or less extent leaving a stain upon the surface cleaned. Furthermore, by means of my improved process the massing of the substance into lumps is entirely avoided, owing to the complete absorption of the oil, which leaves the mixture in a comparatively dry and uniformly granular state.

With the above features and general outlines in view my process consists, in the preferred embodiment, in the following successive steps.

The main body or stock desirably consists of sawdust, which forms about seventy-five per cent. of the mixture and which is first dried by the application of heat or other means until all moisture is eliminated. To the dry sawdust is added approximately twenty-five per cent. of any petroleum product or oily substance, preferably a high grade of non-volatile kerosene. The oil and sawdust are next subjected to vigorous agitation by means of any of the approved forms of mixing devices until a thorough physical distribution of the oil among the particles of sawdust is effected. The mixture in this state is in a condition to materially promote absorption. The length of time necessary for this physical agitation depends upon the general conditions under which the process is carried out and the materials used, but may be conveniently determined by inspecting the mixture, as the oil will, when the mixture is properly effected, adhere to the surface of the sawdust particles in small globules and will be entirely taken up in that way by the sawdust. In order that the oil may be properly absorbed, I next place the mixture in a receptacle and allow it to stand for at least a period of two days. During this time the particles of sawdust will have become thoroughly impregnated with the oil, and the latter will appear upon the outer surfaces of the particles, giving the same a glassy or glazy appearance, the mixture being granular and in a comparatively dry state. It has been found by experiment that better results are attained where the absorbing process is not hurried by resorting to auxiliary means, such as the application of externally or internally applied heat or by the production of an abnormally dry atmosphere, owing to the fact that the foregoing produces an absorption which is not uniform. If the mixture is merely acted upon by a normal and uniform temperature, the result is a uniform and complete absorption. In order to determine whether or not the mixture has stood a sufficient time to complete the absorbing process, I remove a small portion and place it upon a sheet of paper or other material for a limited time—say three or four minutes or as long as the substance would normally remain upon the floor before it is swept, and if there is no stain upon the paper the mixture may be considered to be in a condition to be marketed.

In some cases where it is found necessary to remove the mixture before the absorbing process is entirely completed there may be a tendency on the part of the partially-unabsorbed oil to cause the sawdust particles to adhere and form in lumps. In order to avoid such defective action, a quantity of any form of silicious material, such as sand, may be added to the mixture when prematurely removed in proportions of approximately ten per cent. of the entire mixture. The function of this silicious material is to cut the oil-laden sawdust and separate any lumps. In this connection I do not wish to be limited to sand, as any like substance which could perform the function of separating the clinging particles would be serviceable. If it is still found that small quantities of unabsorbed oil cling to the surfaces of the separated particles when the mixture is prematurely removed, I may make a further addition to the mixture of a suitable oil absorbent, such as chlorid of sodium or its equivalent in suitable proportions. It will be further understood that if sawdust is permitted to completely absorb the oil it will not be necessary to add the sand or chlorid of sodium. Therefore I do not regard the same as essential to the invention, as it can be fully realized without such additions.

The product resulting from the foregoing process and which constitutes with the process the invention herewith disclosed serves to effectively and quickly agglomerate and collect the dust particles from the surface cleaned, leaving the same free from stains or like injury.

What I claim, and desire to secure by Letters Patent, is—

1. The process of producing dust collecting or absorbing substances which consists in thoroughly drying absorbent material, adding thereto a relatively non-volatile oily substance having a boiling-point above 140° Fahrenheit and commingling the materials.

2. The process of producing dust collecting or absorbing substances which consists in thoroughly drying absorbent material, adding thereto a relative non-volatile oily substance having a boiling-point above 140° Fahrenheit, commingling the materials and subsequently permitting the mixture to stand until the said oily substance is practically wholly absorbed.

3. The process of producing dust collecting or absorbing substances which consists in thoroughly drying absorbent material and adding thereto a relatively non-volatile oily substance having a boiling-point above 140° Fahrenheit in such proportion as to fill the pores of the absorbent material without leaving an appreciable quantity of the oily substance on the surface thereof.

4. The process of producing dust collecting or absorbent substances which consists in thoroughly drying sawdust and adding thereto a relatively non-volatile oily substance having a boiling-point above 140° Fahrenheit in such proportions as to fill the pores thereof without leaving a sufficient quantity of the said oily substance upon the surface of the sawdust particles to stain or spot white paper upon which it is placed for a period of three minutes.

5. The process of producing dust collecting or absorbing substances which consists in thoroughly drying sawdust, adding thereto a relatively non-volatile oily substance having a boiling-point above 140° Fahrenheit in the approximate proportion of seventy-five per cent. of the former to twenty-five per cent. of the latter and thoroughly commingling the materials.

6. The process of producing dust collecting or absorbing substances which consists in thoroughly drying sawdust, adding thereto a relatively non-volatile oily substance having a boiling-point above 140° Fahrenheit in the approximate proportions of seventy-five per cent. of the former to twenty-five per cent. of the latter, thoroughly commingling the materials and permitting the mixture to stand until the oily substance is almost wholly absorbed.

7. The process of producing dust collecting or absorbing substances which consists in thoroughly drying sawdust, adding thereto a relatively non-volatile substance having a boiling-point above 140° Fahrenheit in the approximate proportion of seventy-five per cent. of the former to twenty-five per cent. of the latter, thoroughly commingling the materials and adding a granular material thereto.

8. The process of producing dust collecting or absorbing substances which consists in drying sawdust and adding thereto a relatively non-volatile oily substance adapted to form an almost imperceptible permanent film thereon whereby said sawdust is given a permanent affinity for dust and like particles.

9. The process of producing dust collecting or absorbing substances which consists in drying sawdust and adding thereto a relatively non-volatile oily substance adapted to give the said sawdust particles a permanent affinity for dust and like particles, the proportions of the materials being such that an almost inappreciable film of the said oily substance remains upon the surface of this sawdust, the remainder of said oily substance being wholly absorbed.

10. The process of producing dust collecting or absorbing substances which consists in drying sawdust and adding kerosene thereto in such proportions that the latter is almost wholly absorbed.

11. The process of producing dust collecting or absorbing substances which consists in drying sawdust and adding kerosene thereto in such proportions as to fill the pores thereof without leaving a sufficient quantity of the kerosene upon the surface of the sawdust particles to stain or spot white paper upon which it is placed for a period of three minutes.

12. The process of producing dust collecting or absorbing substances which consists in drying sawdust and adding kerosene thereto in the approximate proportions of seventy-five per cent. of the former and twenty-five per cent. of the latter.

13. A dust-collecting substance, comprising comminuted absorbent material impregnated with a relatively non-volatile oily substance having a boiling-point above 140° Fahrenheit and free from any constituent or ingredient which, in the finished product is capable of smearing, staining or soiling fabrics upon which it is used.

14. A dust-collecting substance, comprising sawdust impregnated with kerosene, said material being free from any constituent or ingredient which, in the finished product is capable of smearing, staining or soiling fabrics upon which it is used.

15. A dust-collecting substance, comprising sawdust approximately free from aqueous moisture and containing kerosene absorbed therein, said substance being free from any constituent or ingredient which, in the finished product is capable of smearing, staining or soiling delicate fabrics upon which it is used.

16. The herein-described product, consisting of comminuted absorbent material permanently impregnated with a relatively non-volatile oily substance, the surface of said absorbent material having a glassy or glazy appearance and being free from globules or particles of the said oily substance and said material being free from any constituent or ingredient capable, in the finished product of smearing, staining or soiling fabrics upon which it is used.

17. The herein-described product, consisting of sawdust impregnated with kerosene in such proportions that the said sawdust possesses a glassy or glazy appearance, has a permanent affinity for dust or like particles and is free from globules or appreciable quantities of the kerosene upon its surface, said material being free from any constituent or ingredient which, in the finished product is capable of smearing, staining or soiling fabrics upon which it is used.

In testimony whereof I affix my signature in the presence of two witnesses.

BERTHOLD SINGER.

Witnesses:
L. WALDMAN,
C. HEYMANN.